(12) United States Patent
Konyukhov

(10) Patent No.: US 6,509,703 B1
(45) Date of Patent: Jan. 21, 2003

(54) METHOD AND SYSTEM FOR REDUCED VOLTAGE START-UP OF AC MOTORS IN MULTI-MOTOR SYSTEM

(75) Inventor: Alexander Ivanovich Konyukhov, Woodbridge (CA)

(73) Assignee: Husky Injection Molding Systems, Ltd. (CA)

( * ) Notice: Subject to any disclaimer, the term of this patent is extended or adjusted under 35 U.S.C. 154(b) by 59 days.

(21) Appl. No.: 09/724,047

(22) Filed: Nov. 28, 2000

(51) Int. Cl.$^7$ ................................................. H02P 1/56
(52) U.S. Cl. ........................... 318/101; 318/90; 318/96; 318/104
(58) Field of Search ................................ 318/90, 92, 93, 318/94, 95, 96, 101, 111, 112, 113, 778, 771, 772, 104

(56) References Cited

U.S. PATENT DOCUMENTS

| | | | |
|---|---|---|---|
| 1,123,321 A | * 1/1915 | Lamme | |
| 1,502,909 A | * 7/1924 | Deflassieux | |
| 2,693,561 A | * 11/1954 | Barrell | |
| 3,035,222 A | * 5/1962 | Stone | |
| 4,675,591 A | * 6/1987 | Pleiss | 318/773 |
| 4,691,155 A | * 9/1987 | Taylor et al. | 318/771 |
| 5,065,305 A | * 11/1991 | Rich | 318/771 X |
| 5,068,587 A | * 11/1991 | Nakamura | 318/771 |
| 5,177,423 A | * 1/1993 | Nakamura et al. | 318/767 |
| 5,614,799 A | * 3/1997 | Anderson et al. | 318/439 |
| 5,838,135 A | * 11/1998 | Satake et al. | 318/771 |
| 6,356,041 B1 | * 3/2002 | Smith | 318/34 |

FOREIGN PATENT DOCUMENTS

| | | | |
|---|---|---|---|
| DE | 919179 | 10/1954 | |
| DE | 89 09 122 U | 11/1989 | H02P/7/43 |
| EP | 56015177 | 2/1981 | H02P/1/56 |
| EP | 59067882 | 4/1984 | H02P/1/32 |
| EP | 0780961 | 6/1997 | |
| FR | 1464625 | 3/1967 | |
| SU | 1599966 | 10/1990 | H02P/7/74 |

* cited by examiner

*Primary Examiner*—Bentsu Ro
(74) *Attorney, Agent, or Firm*—Katten Muchin Zavis Rosenman

(57) ABSTRACT

A method and system that provides for simultaneous or independent start-up of two or more three-phase AC motors with reduced starting current. Two AC motors have their stator windings connected in series across the power network. If more than two AC motors are to be started, the stator windings of the additional motors are connected in parallel with the stator windings of one or both of the first two motors and the phase leads of the additional motors are connected to the power network. The voltage result vector is less than the sum of the rated voltage of each motor. After a preset time delay or when the motors reach a certain speed, the rated voltage is applied to each motor by disconnecting the stator windings from the series connection and connecting the stator windings of each motor in a delta configuration.

16 Claims, 9 Drawing Sheets

METHOD AND SYSTEM FOR REDUCED VOLTAGE START-UP OF AC MOTORS IN MULTI-MOTOR SYSTEM

BACKGROUND OF THE INVENTION

1. Field of the Invention

The present invention relates to an AC motor starting system and method and, more particularly, a multiple AC motor starting system and method.

2. Related Prior Art

Multiple AC motor starting systems are known. One prior art system is disclosed in Soviet Union Pat. No. 1822318 A1.

In the motor starting method and system disclosed in the SU patent, the motor stator windings of two motors are connected in series and the voltage of the power network is applied to them. The result vector of the power network is less than the sum of the rated voltage of each motor. After the motors reach a certain speed, the rated voltage is applied to each motor. This is achieved by creating a neutral point at the neutral side of the motors. The voltage result vector, which is less than the sum of the rated voltage of each motor, is the line to line voltage of the power network.

To decrease the starting current, current limiting resistors or reactors are inserted in series with the motors before applying the voltage of the power network. The resistors are shunted out of the circuit after applying this voltage when the motors have reached a certain speed.

The system includes a first motor having phase leads of the stator windings connected to the power network through a switching means, such as a circuit breaker, contactor or other switching device, and a second motor with phase leads of the stator windings connected to the power network by another switching means. The phase leads of the two motors are transposed with respect to one another. Another switching means is connected to the neutral ends of the motors at the point of their series connection to create a neutral point for both motors.

This prior art starting method and system has a number of problems.

First, since the phase to phase voltage is applied to the two motors connected in series, the starting current can only be reduced to 86.5% of the starting current which would occur when the full line voltage is applied to the motor. Reducing the starting current to less than 86.5% requires the use of additional current limiting resistors or reactors and switching means to shunt them out of the circuit when the motors reach a certain speed.

Second, the prior art method and starting system is only useful in applications with substantially identical motors having similar starting impedances.

Third, the number of motors, which can be started simultaneously with reduced starting current, does not exceed two. To reduce the starting current in the system with more than two motors, additional current limiting resistors or reactors and switching means must be used.

Furthermore, this method and system can be used only to start up AC motors designed to work continuously with star type connections of the stator windings. The method and system cannot be used for delta type stator winding connections of AC motors, which are most commonly used in industrial applications.

SUMMARY OF THE INVENTION

The primary objective of the present invention is to provide a method and system for starting multiple AC motors simultaneously while maintaining a lower start-up current than was possible with prior art designs.

Another object of the invention is to provide a start-up circuit for AC motors having delta type stator winding connections where the start-up current is substantially reduced.

A further object of the invention is to provide a multiple AC motor start-up circuit capable of simultaneously starting multiple motors of varying sizes and using a reduced start-up current.

According to the invention there is provided a method of start-up of AC motors in a multi-motor system and a system to perform this method comprising the connecting of the motor stator windings in series or, where more than two motors are being started, in parallel/series, applying the voltage of the power network to the motors, the result vector of which is less than the sum of the rated voltage of each motor, and, after a preset time delay or when the motors reach a certain speed, applying the rated voltage to each motor by disconnecting the stator windings from the series connection and creating a delta type connection of the stator windings.

The system which performs this method comprises one motor having phase leads of the stator windings connected to the power network by switching means such as a circuit breaker, contactor or other switching device, and another motor having phase leads of stator windings connected to the power network by another switching means where the phase leads are circularly transposed. A third switching means is installed in series between the stator windings of the motors. Two further switching means are connected to both sides of each motor in order to create the delta type connection of the motor stator windings.

A further feature of the invention is that by providing an additional switching means connected to the series connection between the stator windings on one side and connected together on the other side to provide a neutral point, the motors can be started up individually with a Wye connection and, when they reach a certain speed, are converted to the delta running connection desired.

An additional resistor or reactor may be installed in series with the switching means installed between the motor stator windings and the point of their series connection to further reduce the starting current.

Where more than two motors are to be started at one time, the additional motors can be paired in parallel sets which then have their stator windings connected in series with the stator windings of another parallel pair of motors.

DETAILED DESCRIPTION OF THE PREFERRED EMBODIMENTS

Figure 1:
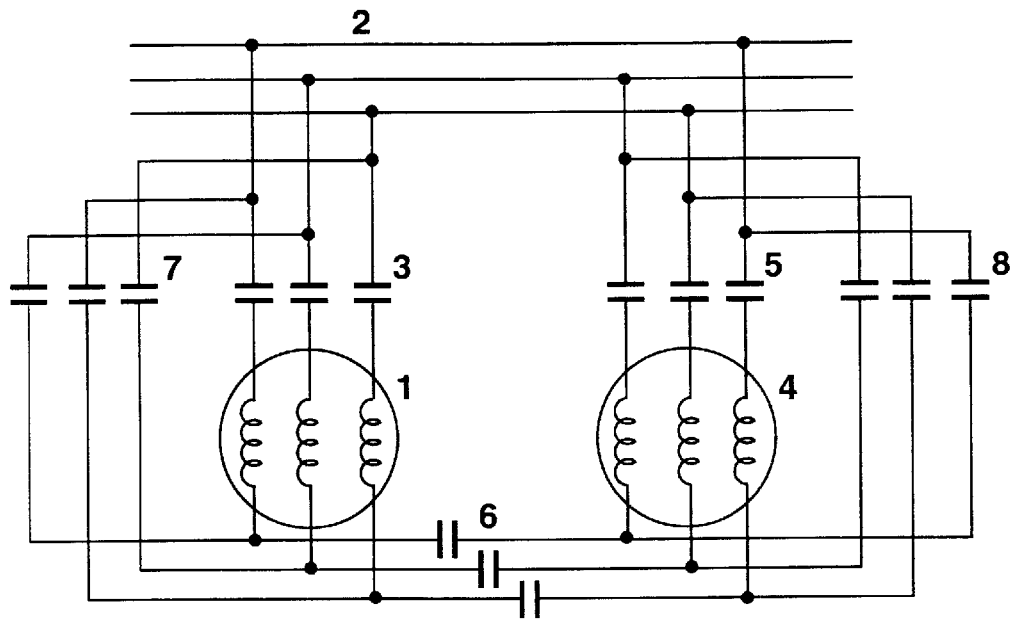
FIG. 1 is a schematic of a preferred embodiment of the invention in a system for simultaneously starting two motors.

The features and advantages of the present invention will become more apparent from the following detailed description when taken in conjunction with the accompanying drawings. In the drawings, like elements have been designated with the same reference characters for ease of understanding.

In the preferred embodiment of the invention shown in FIG. 1, a first three-phase AC motor 1 is connected to the power network 2 by means of the switching device 3. A second three-phase AC motor 4 is connected to the same power network 2 by means of switching device 5. The phase connections of the two motors 1 and 4 are circularly transposed with respect to one another. Switching device 6 is connected between the stator windings of motors 1 and 4. The switching device 7 is connected, at one side, to the connection point of motor 1 to the power network 2 and, at its other side, to the connection point of the stator winding of motor 1 to the switching device 6. Closing of switching device 7 enables the creation of a delta type of motor stator winding in motor 1. Similarly, the switching device 8 is connected, at one side, to the connection point of motor 4 to the power network 2 and, at its other side, to the connection point of the stator winding of motor 4 to the switching device 6. This enables the creation of a delta type of motor stator winding in motor 4.

At the initiation of start-up, both motors 1 and 4 are stopped and all of the switching devices 3, 5, 6, 7 and 8 are open. The closing of switching devices 6, 3 and 5 applies the line to line voltage of the power network 2 to the stator windings of motors 1 and 4 which are now connected in series.

In this case the starting current, Ist, through each winding is equal to:

$$Ist = Us/(Xs + Xm1 + Xm4),$$

where Us is the line to line voltage of the power network,
Xm1 and Xm4 are the starting impedance's of the motors 1 and 4, respectively, and
Xs is the power network impedance.

The value of the starting current, in the case of identical motors or motors which have the same or a very similar starting impedance, is approximately two times less than the starting current which would occur during direct on-line start-up of one motor with a delta type stator winding connection. This is approximately ten percent less than the starting current during Wye/delta start-up of one motor.

After a preset time delay or when the motors reach a certain speed, the switching device 6 opens and switching devices 7 and 8 close. By this operation, the stator windings of motors 1 and 4 are connected in a delta type connection and the rated voltage is now applied to each motor.

Figure 1A:
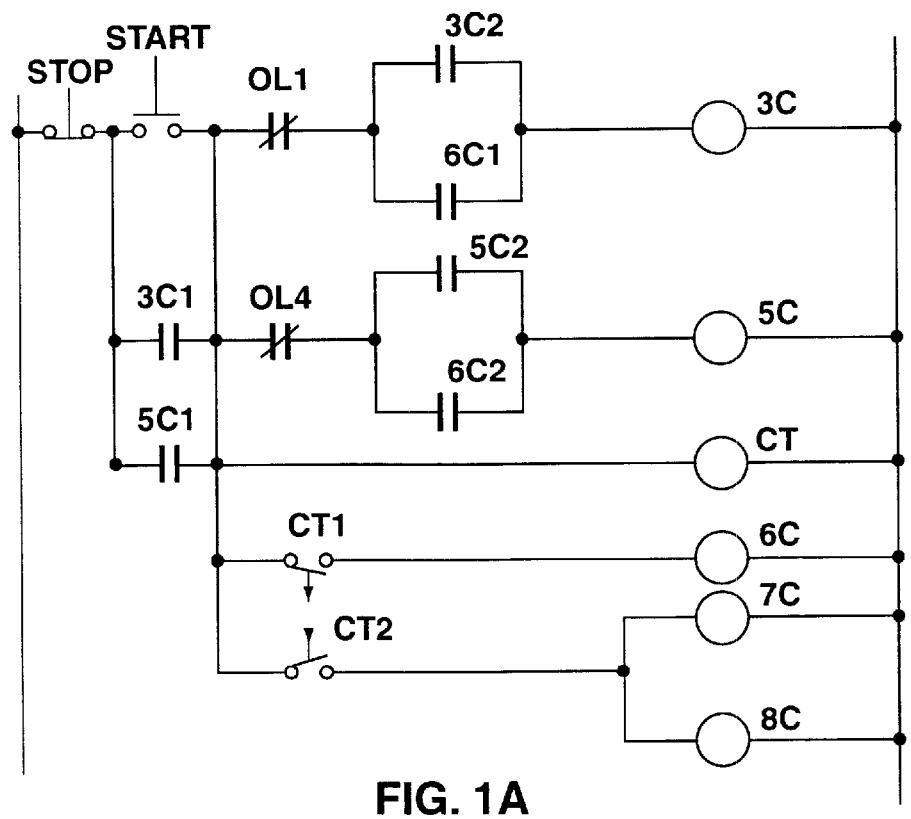
FIG. 1A is a schematic drawing of a control circuit that could be used with the embodiment of the invention shown in FIG. 1.

FIG. 1A illustrates an exemplary control circuit that could be used for starting the motors 1 and 4 illustrated in FIG. 1.

In FIG. 1A, the control components corresponding to the switching devices shown in FIG. 1 have the same primary reference character as is used in FIG. 1. For example, the switching coil for switching device 6 is identified as coil 6C and the control contacts for switching device 6 are identified as contacts 6C1 or 6C2.

To start the motors 1 and 4, the start button is pressed. Power is thereby applied to coil CT, which controls timing relay contacts CT1 and CT2. When coil CT energizes it closes contact CT1 for a predetermined interval. During this interval, coil 6C of switching device 6 is activated and closes the power contacts on switching device 6, shown in FIG. 1, and control contacts 6C1 and 6C2 in the control circuit. The closing of control contacts 6C1 and 6C2 provides power to the coils 3C and 5C of switching devices 3 and 5, respectively. When coils 3C and 5C are thusly activated, the power contacts of switching devices 3 and 5, shown in FIG. 1, are closed and the line to line voltage is applied to the stator windings of motors 1 and 4 in series. The coils 3C and 5C also close the control contacts 3C1, 3C2, 5C1 and 5C2 so that when the timing relay contact CT1 opens, power will still be supplied to the coils 3C and SC to maintain the power and control contacts of the switching devices 3 and 5 closed. The opening of timing relay contact CTI removes power from coil 6C and the power contacts of switching device 6 and the control contacts 6C1 and 6C2 open. When the timing relay contact CT1 opens, the relay contact CT2 closes to thereby provide power to the coils 7C and 8C of the switching devices 7 and 8 and thereby close the power contacts of the switching devices 7 and 8. Thus the stator windings of motors 1 and 4 are each separately connected to the power line 2 in a delta configuration.

The start button need only be held pressed long enough for the coils 3C and 5C of switching devices 3 and 5 to be activated as power is provided to the coils 3C and 5C through control contacts 3C1 and 5C1. Simple opening of the stop switch disables the control circuit and opens all of the contacts of switching devices 3, 5, 6, 7 and 8 and thereby stops motors 1 and 4.

The overload relays OL1 and OL4 respond to an excess current in the stator windings of motors 1 and 4, respectively, to disable the respective coil 3C or 5C and thereby disconnect the respective motor 1 or 4 from the power line.

Figure 2:
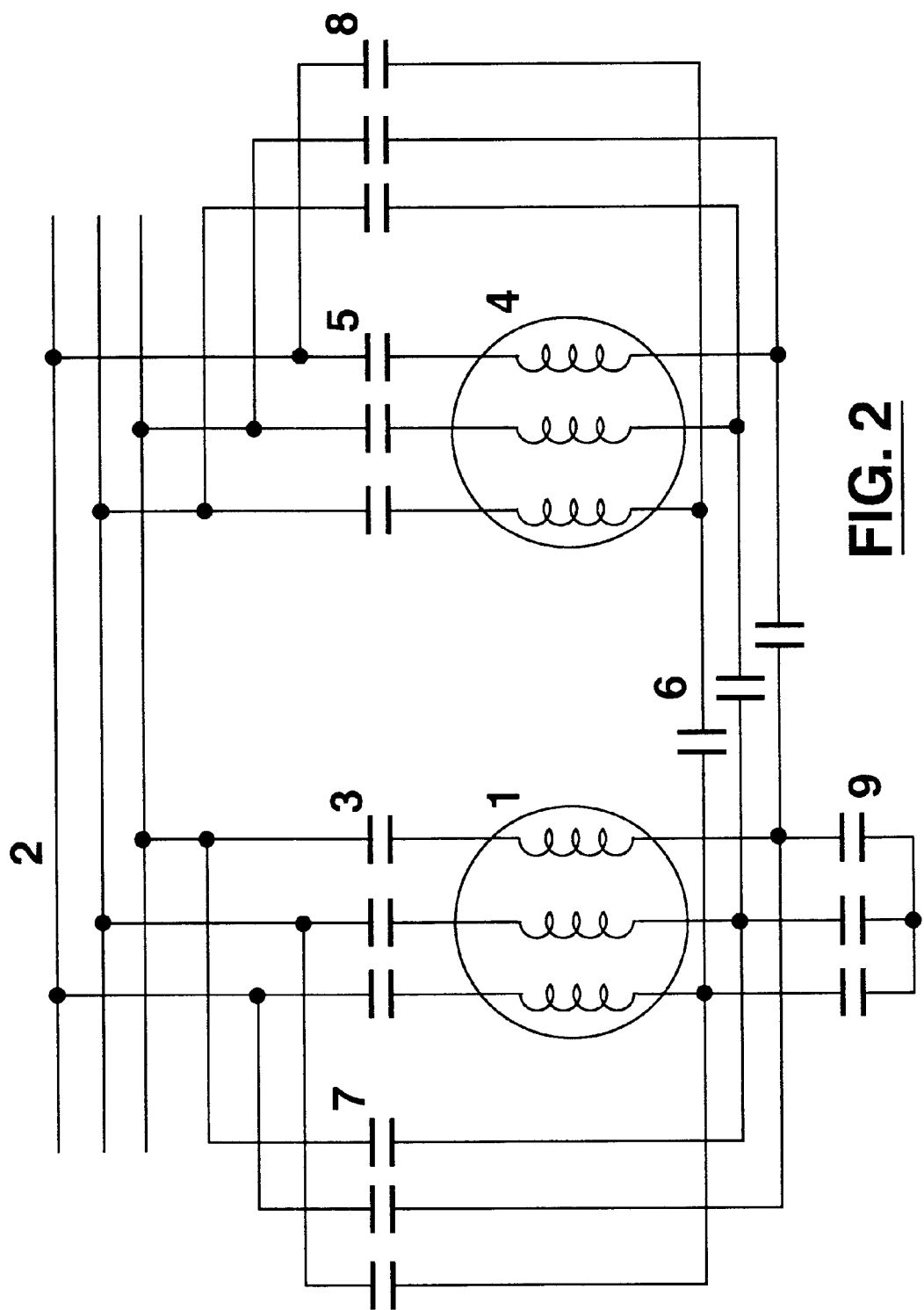
FIG. 2 is a schematic of a preferred embodiment of the invention in a system for simultaneously starting two motors with the additional feature of enabling each motor to start-up independently.

FIG. 2 shows the same schematic as FIG. 1 with the added feature of enabling the starting of each motor independently of the other by the known Wye/delta starting method. This is achieved by providing the switching device 9 which is connected, on one side, to the connection points of the stator windings of motor 1 and switching device 6, and with leads from the other side of the switching device 9 connected together to provide the neutral point.

According to FIG. 2, the additional switching device 9 provides for independent start-up of each motor 1 and 4. Before the independent start-up of the motors 1 and 4, all switching devices 3, 5, 6, 7, 8 and 9 are open. To start up, for example, motor 4, the switching devices 5, 6 and 9 are closed and motor 4 starts with reduced voltage because of the Wye type connection of the stator winding of motor 4. After a preset time delay, switching device 6 opens and switching device 8 closes. At this point, motor 4 works at the rated voltage with a delta type connection.

Motor 1 can be subsequently started independently of whether motor 4 is running or not. Closing of switching device 3 causes motor 1 to start with reduced voltage as the closed switching device 3 connects the windings of motor 1 in a Wye connection through the closed switching device 9. After a certain time, switching device 9 opens and switching device 7 closes so that motor 1 works at the rated voltage in a delta connection.

Figure 2A:
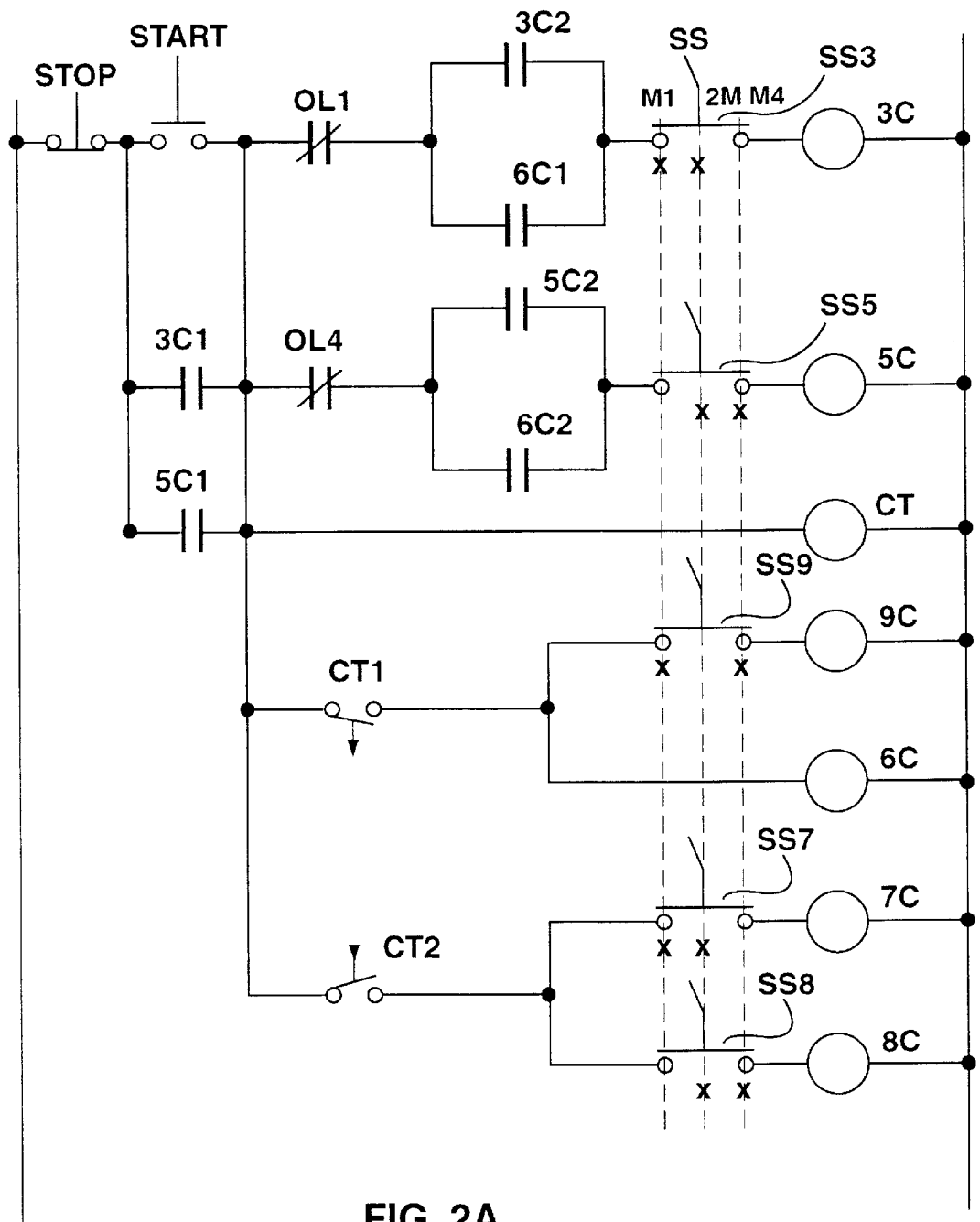
FIG. 2A is a schematic drawing of a control circuit that could be used with the embodiment of the invention shown in FIG. 2.

FIG. 2A illustrates schematically a control circuit that could be used to start the motors 1 and 4 shown in FIG. 2. This control circuit differs from the control circuit of FIG. 1A by the addition of the selector switch SS and the coil 9C. Selector switch SS has switching contacts SS3, SS5, SS9, SS7 and SS8. Switching contact SS9 controls the coil 9C.

Selector switch SS is a three position switching device that enables the motors 1 and 4 to be started together or individually. To start motor 1, selector switch SS should be in a position where switching contacts SS3, SS7 and SS9 are closed. The timing relay coil CT is energized to close timing relay contact CT1 by pressing the start button. This action operates coil 6C which, in turn, enables coil 3C to thereby close contacts 3. Closing of timing relay contact CT1 also energizes coil 9C to close contacts 9 and thereby connect motor 1 to the line to line voltage 2 in a wye connection. After a predetermined interval or when the motor reaches a specified speed, the timing relay contact CT1 opens to thereby de-energize coil 9C and CT2 closes to energize coil 7C to thereby close contacts 7. At this time, motor 1 is in the delta connection for general operation. The contacts 3 are maintained closed by the operation of coil 3C.

To start motor 4 on its own, the selector switch SS is switched to a position where the switching contacts SS5, SS9 and SS8 are closed. In this position, the activation of timing relay contact CT1 activates coils 9C and 6C to close contacts 6 and 9. The activation of coil 9C also closes control contact 6C2 to thereby energize coil SC and close contacts 5 to connect the windings of motor 4 in a wye connection through contacts 5 and 6. After a predetermined time delay or a specified motor speed is reached, the timing relay contact CT1 opens and the timing relay contact CT2 closes to thereby de-energize coil 9C, open contacts 9, energize coil 8C and close contacts 8 to thereby connect motor 4 to the line to line voltage in a delta connection through contacts 5 and 8.

Figure 3:
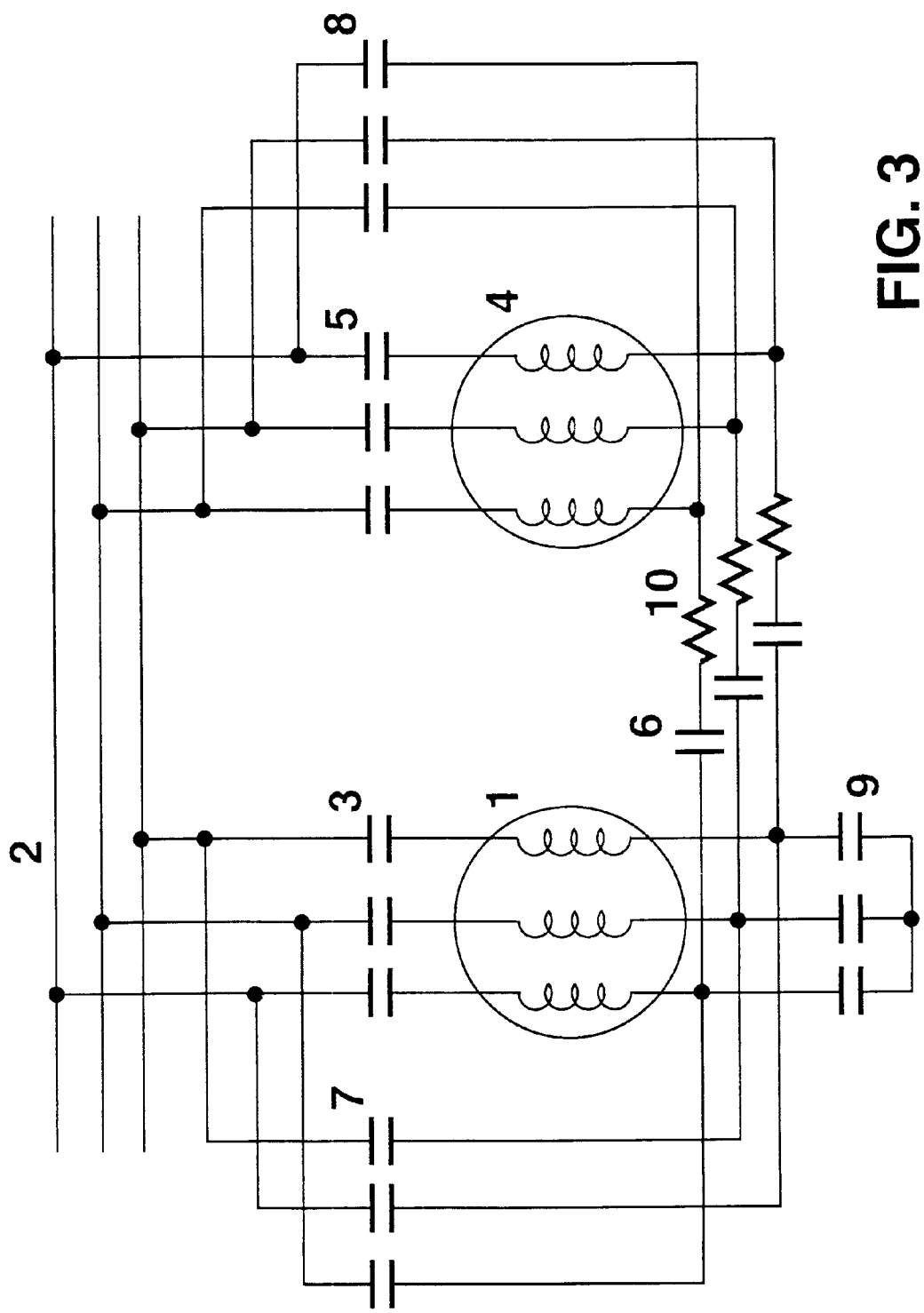
FIG. 3 is a schematic of a preferred embodiment of the invention in a system for simultaneously starting two motors having a further reduced starting current.

To start both motors simultaneously, selector switch SS is set with switching contacts SS3, SS5, SS7 and SS8 closed. The switching contacts SS9 are open and the coil 9C is not activated. The circuit now works in the same manner as the control circuit shown in FIG. 1A The embodiment in FIG. 3 shows an arrangement that can be used to further reduce the motor starting current. Additional resistors or reactors 10 are inserted in series with the switching device 6 and the stator windings of motors 1 and 4.

The sequence of the operation is the same as for the schematic shown in FIG. 1; however, the starting current is less than that for the embodiment shown in FIG. 1. The starting current, Ist, is given by the equation:

$$Ist=Us/(Xs+Xm1+Xm4+Xr),$$

where Xr is the impedance of the current limiting resistor or reactor 10;
Xm1 and Xm4 are the starting impedance's of the motors 1 and 4, respectively;

Xs is the impedance of the power network; and
Us is the line to line voltage of the power network.

The level of starting current reduction is determined by the value of the current limiting resistor or reactor 10.

While the invention could obviously be applied to the situation where the stator windings of more than two motors are connected in series, there are practical limitations since the starting current could be reduced to the point where the current creates insufficient torque in the motor to initiate its rotation. It has been found that the most practical manner in which to implement the invention is to connect no more than two motors in series and, where it is desired to simultaneously start more than two motors, to connect the windings of the additional motors in parallel with the windings of the first two motors as will be described hereinafter with reference to the embodiments shown in FIGS. 4, 5, 7 and 8.

Figure 4:
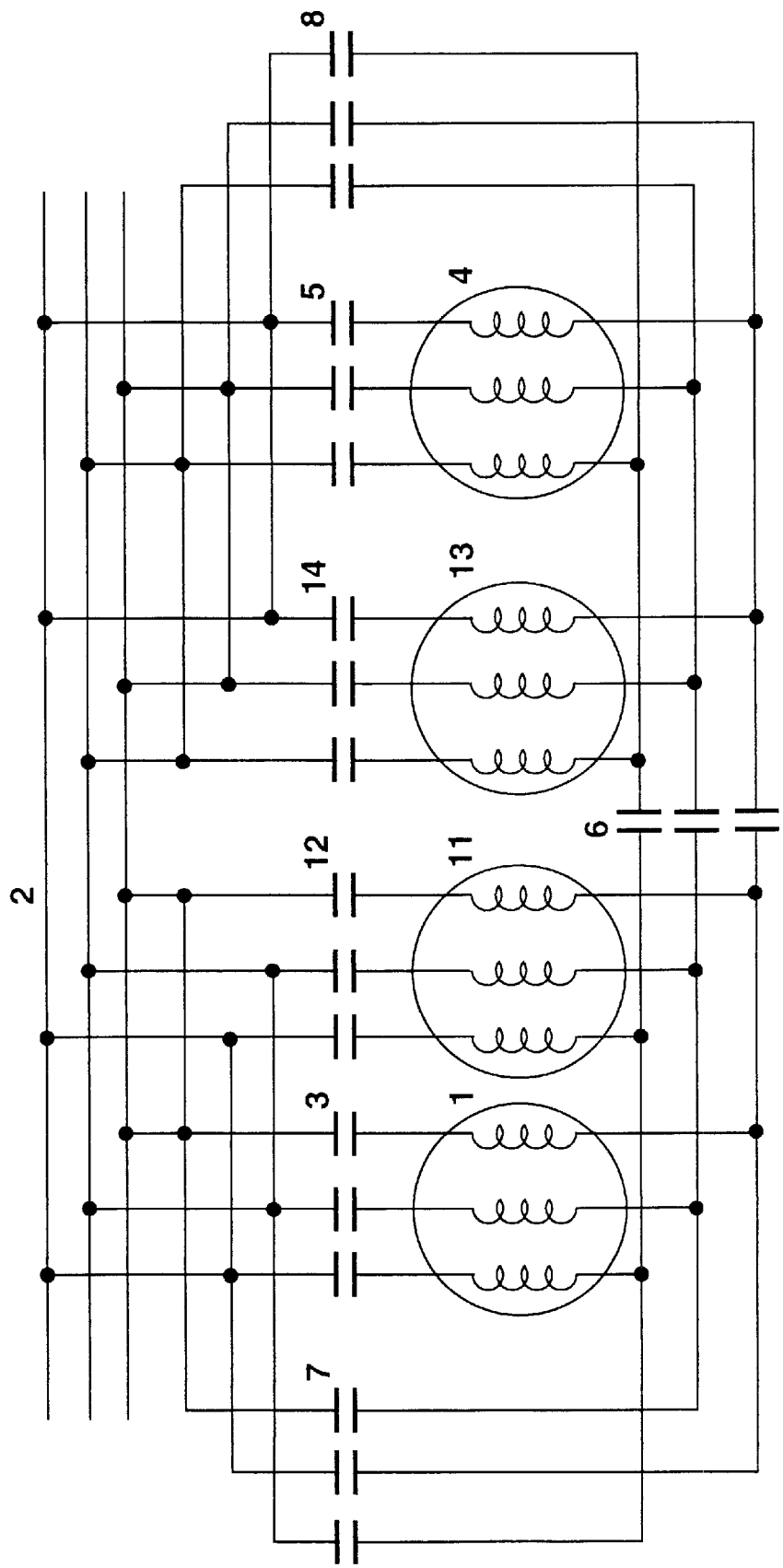
FIG. 4 is a schematic of a preferred embodiment of the invention in a system for simultaneously starting four or more motors.

FIG. 4 shows an embodiment of the invention which can be used to start-up four or more motors. In this embodiment, the additional motor 11 is connected to line switching device 12 in parallel with motor 1 and additional motor 13 is connected to line switching device 14 in parallel with motor 4.

Before the simultaneous start-up of the motors 1, 4, 11 and 13, all switching devices 3, 5, 6, 7, 8, 12 and 14 are open.

When switching devices 3 and 12 are closed, motors 1 and 11 are connected in parallel. Similarly when switching devices 5 and 14 are closed, motors 4 and 13 are connected in parallel. By closing switching device 6, the phase to phase voltage of the power network 2 is applied to the stator windings of each pair of parallel motors 1 and 11 and 4 and 13 with the windings of each pair connected in series with the windings of the other pair. The windings of motors 4 and 13 are transposed with respect to the windings of motors 1 and 11.

For this circuit, the starting current, Ist, is given by the equation:

$$Ist=Us/[Xs+Xm1*Xm11/(Xm1+Xm11)+Xm4*Xm13/(Xm4+Xm13)],$$

where Us is the line to line voltage of the power network,
Xm1, Xm4, Xm11 and Xm13 are the starting impedance's of the motors 1, 4, 11 and 13, respectively, and
Xs is the power network impedance.

The value of the starting current in the case of the simultaneous start-up of four identical motors is approximately equal to the starting current during direct on-line start-up of one motor with a delta type stator winding connection.

After a preset time delay or when the motors reach a certain speed, the switching device 6 opens and switching devices 7 and 8 close. The stator windings of motors 1, 11, 4 and 13 are now connected in a delta type connection and the rated voltage is applied to each motor.

Figure 5:
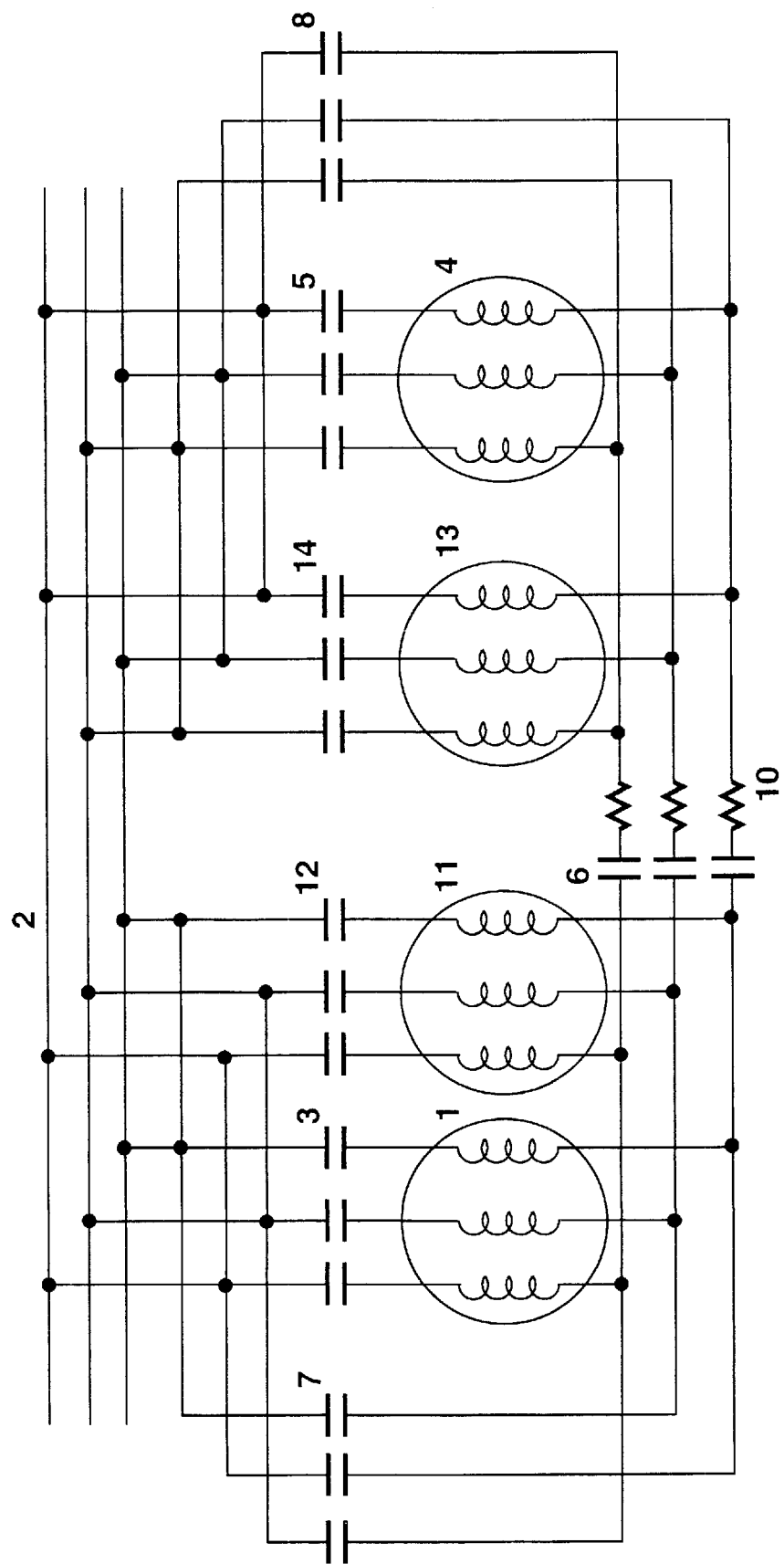
FIG. 5 is a schematic of a preferred embodiment of the invention in a system for simultaneously starting four or more motors with a further reduced starting current.

FIG. 5 shows the same circuit as shown in FIG. 4 with the addition of resistors or reactors 10 in series with the switching device 6 to further reduce the starting current.

The sequence of the operation in this case is the same as for the circuit shown in FIG. 4. However, the starting current is less because of the increased impedance in the starting circuit. The amount of starting current reduction depends on the value of current limiting resistors or reactors 10.

Figure 6:
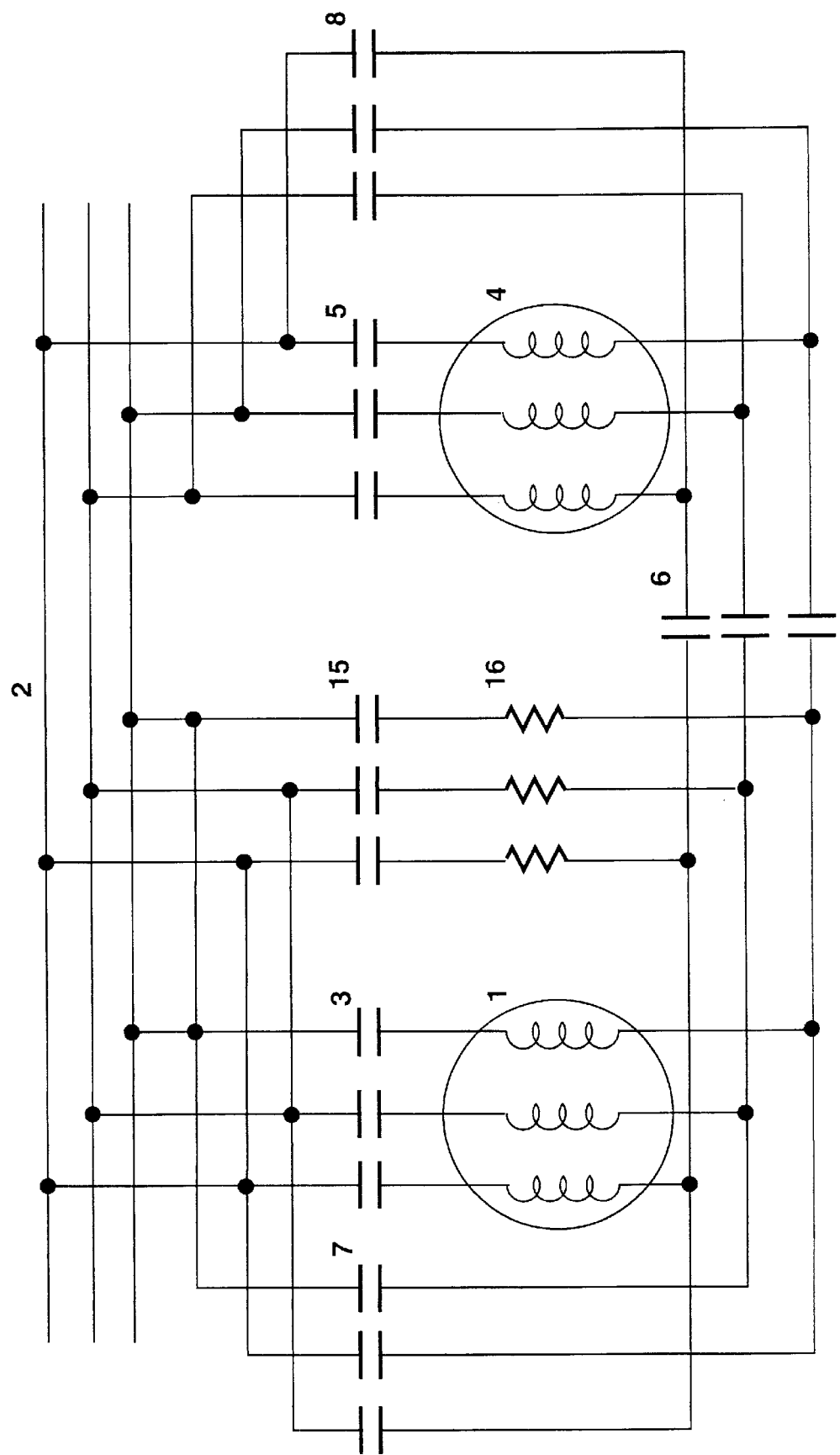
FIG. 6 is a schematic of a preferred embodiment of the invention in a system for simultaneously starting two motors which are of different sizes.

FIG. 6 shows an embodiment of the invention where the two motors are of different sizes. To simultaneously start up the two motors 1 and 4 where motor 1 is smaller in size than motor 4, additional switching device 15 and resistors or reactors 16 are connected in parallel with each phase of the stator windings of motor 1.

In this example, the impedance of motor 1 is 'n' times greater than the impedance of motor 4. Before the simultaneous start-up of the motors 1 and 4, all switching devices 3, 5, 6, 7, 8 and 15 open. Closing switching devices 3 and 15 places the stator windings of motor 1 in a parallel circuit with resistors or reactors 16. By closing switching devices 5 and 6, the phase to phase voltage of the power network 2 is applied to the stator winding of motor 1 in parallel with resistors or reactors 16, and in series with the stator windings of motor 4.

The starting current, Ist, flowing through the stator windings of motor 4 is given by the equation:

$$Ist=Us/[Xs+Xm4+Xm1*Xr/(Xm1+Xr)],$$

where Us is the line to line voltage of the power network,
   Xm1 and Xm4 are the starting impedances of the motors 1 and 4, respectively,
   Xr is the impedance of the current limiting resistors or reactors 16 and
   Xs is the power network impedance.

The value of starting current flowing through the stator windings of the motor 1 is less than the starting current flowing through the stator windings of motor 4. It is desirable to have the same voltage drop across the stator windings of both motors 1 and 4. The voltage drop across the motors is controlled by the ratio n=Xm1/Xm4 and the value of Xr.

In order to get the same drop voltage at the stator windings of both motor 1 and motor 4, the value of Xr is calculated as:

$$Xr=n*Xm4/(n-1)$$

As can be seen from the above equation, the larger the difference between the motor starting impedance of the motors 1 and 4, the less the value of the impedance Xr must be.

After a preset time delay or when the motors 1 and 4 reach a certain speed, the switching devices 6 and 15 open and switching devices 7 and 8 close. The stator windings of motors 1 and 4 are now connected into a delta type connection and the rated voltage is applied to each motor.

Figure 7:
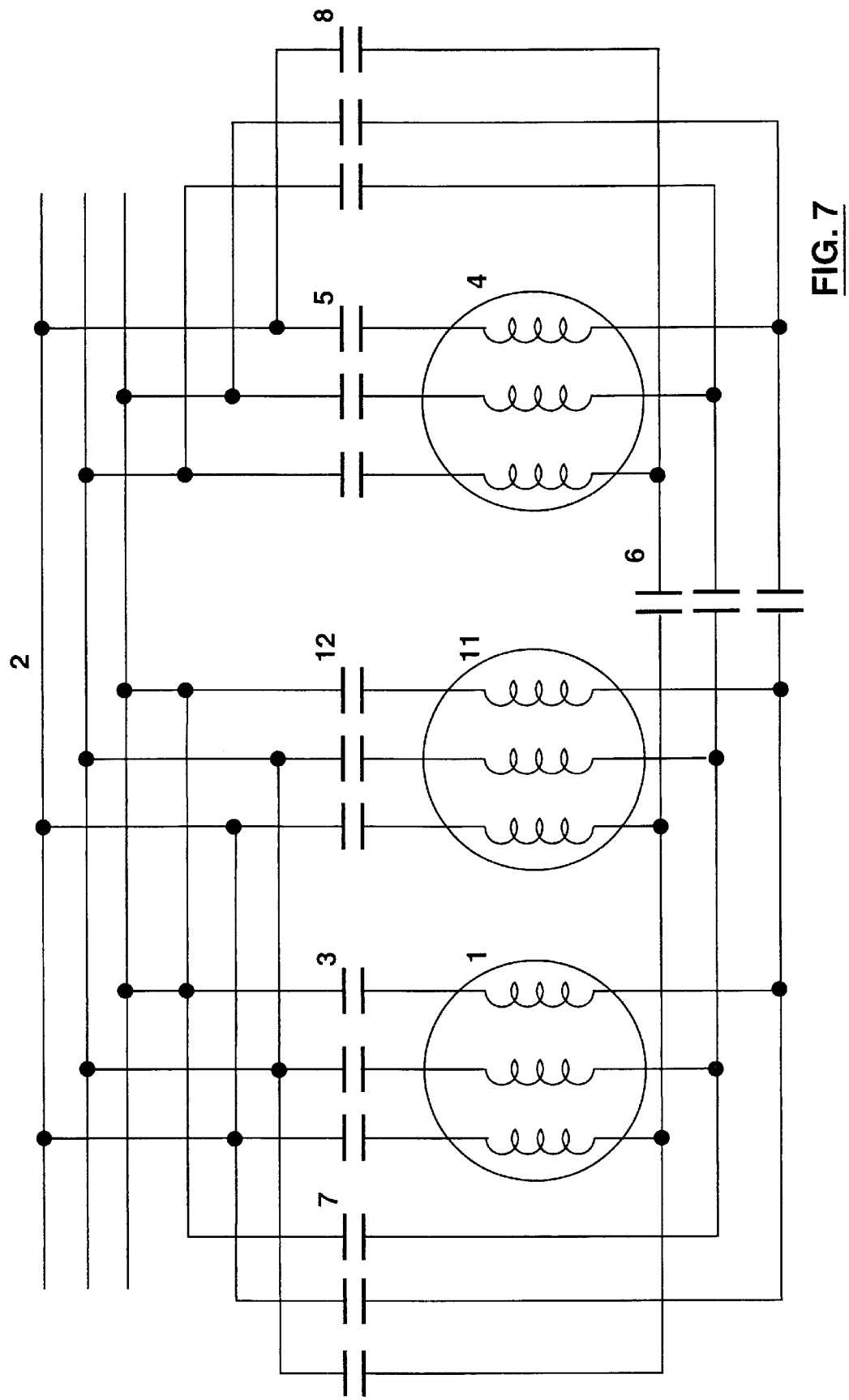
FIG. 7 is a schematic of a preferred embodiment of the invention in a system for simultaneously starting three motors of different sizes.

FIG. 7 shows an embodiment of the invention where the system has three motors of different sizes. In this example, motors 1 and 11 are two times smaller in size than motor 4.

Before the simultaneous start-up of the motors 1, 4 and 11, all switching devices 3, 5, 6, 7, 8 and 12 are open. Closing switching devices 3 and 12 puts the stator windings of motors 1 and 11 in parallel. Closing switching devices 5 and 6 applies the phase to phase voltage of the power network 2 to the stator windings of motor 1 in parallel with motor 11, and the stator windings of motor 4 in series with the stator windings of motors 1 and 11. The windings of motor 4 are transposed with respect to the windings of motors 1 and 11.

In this case the starting current, Ist, flowing through the stator windings of the motor 4 is determined by the equation:

$$Ist=Us/[Xs+Xm4+Xm1/2],$$

where Us is the line to line voltage of the power network,
   Xm1, Xm11 and Xm4 are the starting impedances of the motors 1, 11 and 4, respectively,
   Xs is the power network impedance, and
   Xm1 is equal to Xm11.

The value of starting current flowing through the stator windings of motors 1 and 11 is two times less than the starting current flowing through the stator windings of motor 4. This gives the same drop voltage at the stator windings of motor 1 and motor 11 as at the stator windings of motor 4.

After a preset time delay or when the motors 1, 11 and 4 reach a certain speed, switching device 6 opens and switching devices 7 and 8 close. By this operation, the stator windings of motors 1, 11 and 4 are connected into a delta type connection and the rated voltage is applied to the stator windings of each motor 1, 11 and 4.

Figure 8:
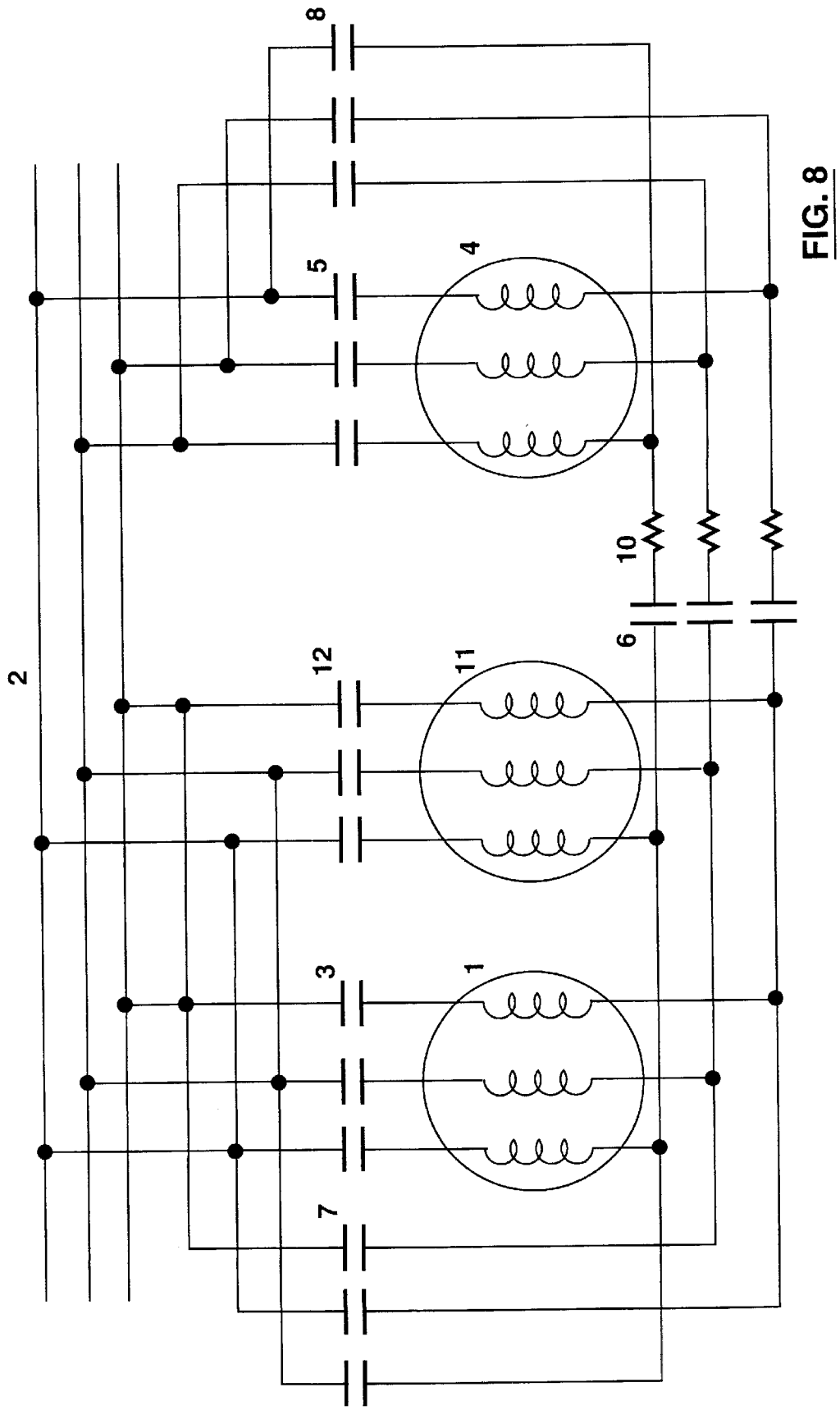
FIG. 8 is a schematic of a preferred embodiment of the invention in a system for simultaneously starting three motors of different sizes and using a further reduced starting current.

FIG. 8 shows the embodiment of FIG. 7 with means to further reduce the starting current. This is achieved by adding resistors or reactors 10 in series with the switching device 6.

The addition of the resistors or reactors 10 in series with the paralleled stator windings of motors 1 and 11, and the stator winding of motor 4 reduces the starting current in the same manner as the additional resistances or reactance 10 did in the example shown in FIG. 3. The sequence of operations is the same as for the example shown in FIG. 7 except that the starting current has been reduced.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A system for simultaneously starting a plurality of three-phase AC motors with a reduced starting current, said system comprising:
   a first motor having phase leads of stator windings connected to a power network through a first switching means;
   a second motor with phase leads of stator windings connected to said power network through a second switching means;
   said stator windings of said first motor being connected in series with said stator windings of said second motor through a third switching means; said phase leads of said first motor being circularly transposed with respect to the phase leads of said second motor;
   a fourth switching means connected to both sides of said first motor to connect said stator windings of said first motor in a delta type connection; and
   a fifth switching means connected to both sides of said second motor to connect said stator windings of said second motor in a delta type connection.

2. The system of claim 1, further including an additional switching means connected, on one side, to the series connection of any said motor stator windings and connected, on the other side of said switching means, to each other to provide a neutral point for the stator windings of a selected motor when said additional switching means is in a closed position.

3. The system of claim 1 or claim 2, further including an impedance means in series with said third switching means.

4. The system of claim 1, further including an additional three-phase AC motor and an additional switching means connected in parallel with each of said first and second motors and said first and second switching means.

5. The system of claim 1, wherein an additional three-phase AC motor and an additional switching means are connected in parallel with one of said motors and one of said first or second switching means.

6. The system of claim 1, wherein an additional impedance means and additional switching means are connected in parallel with one of said motors and one of said first or second switching means.

7. A system for simultaneously starting a plurality of three phase AC motors, said system comprising:

at least one three-phase AC motor having phase leads of stator windings connected to a power network;

at least one other three-phase AC motor having phase leads of stator windings connected to said power network;

said stator windings of said at least one motor being connected in series with said stator windings of said at least one other motor through a first switching means, said phase leads of said at least one motor being transposed with respect to the phase leads of said at least one other motor;

a second switching means connected to both sides of said at least one motor; and a third switching means connected to both sides of said at least one other motor;

whereby when said first switching means is closed a reduced starting current flows through said series connected windings and when said first switching means is open and said second and third switching means are closed, said at least one motor and said at least one other motor are separately delta connected to said network.

8. The system of claim 7, further including an additional switching means connected, on one side, to the series connection of any said motor stator windings and connected, on the other side of said switching means, to each other to provide a neutral point for the stator windings of a selected motor when said additional switching means is in a closed position.

9. The system of claim 7 or claim 8, further including an impedance means in series with said first switching means.

10. The system of claim 7 wherein a fourth switching means is connected between said windings of said at least one motor and said power network and a fifth switching means is connected between said windings of said other motor and said power network.

11. The system of claim 10 further including an additional three-phase AC motor and an additional switching means connected in parallel with each of said at least one and said at least one other motors and said fourth and fifth switching means.

12. The system of claim 10, or 11, wherein an additional three-phase AC motor and an additional switching means are connected in parallel with one of said motors and one of said fourth or fifth switching means.

13. The system of claim 10, or 11, wherein an additional impedance means and additional switching means are connected in parallel with one of said motors and one of said fourth or fifth switching means.

14. The system of claim 7, further including additional three-phase AC motors connected in parallel with each of said at least one and at least one other motors.

15. The system of claim 7, wherein an additional three-phase AC motor is connected in parallel with one of said motors.

16. The system of claim 7, wherein an additional impedance means is connected in parallel with one of said motors.

* * * * *